Patented June 6, 1950

2,510,851

UNITED STATES PATENT OFFICE 2,510,851

ETHYL CELLULOSE-PHENOL MODIFIED COUMARONE-INDENE LACQUER FOR POLYSTYRENE

Kenneth D. Bacon and Arthur E. Young, Midland, Mich., assignors to The Dow Chemical Company, Midland, Mich., a corporation of Delaware No Drawing. Application September 10, 1948, Serial No. 48,756

10 Claims. (Cl. 260—17)

This invention concerns a composition for coating surfaces of polystyrene.

In the manufacture of molded polystyrene objects, it is sometimes desirable to coat or cover the surface to produce a pleasing color effect or to bring out the outline of printing or a design molded into the object. However, conventional coating compositions adhere very poorly or spottily to polystyrene, and frequently cause crazing of the molded surface. A very few lacquers, specially formulated for use on polystyrene, have shown fair adhesion but these have generally exhibited poor moisture resistance, sometimes peeling off completely when the lacquered polystyrene object is soaked in water. Certain enamel-type coatings, while giving satisfactory adhesion and surface hardness, require so long a drying-time as to be commercially impractical in coating moldings produced at high rates.

The principal object of the present invention, then, is to provide an improved coating composition which will adhere firmly to the surface of articles molded of polystyrene and will not cause crazing. A related object is to provide a quick-drying lacquer which, when applied to polystyrene, will possess excellent moisture resistance.

These objects are realized according to the invention by a lacquer in which the identity and relative proportions of the components both of the resinous vehicle and of the solvent are of the utmost importance. Briefly, the vehicle of the new lacquer consist essentially of ethyl cellulose and a phenol-modified coumarone-indene resin, with the optional addition of a compatible plasticizer. The solvent is made up of one or more alcohols or ether-alcohols boiling in the range of 75° to 140° C., with the possible presence of a small proportion of lower alkyl acetate or other diluent.

The ethyl cellulose component of the resinous vehicle may be any of the solvent-soluble grades of this material, e. g. those containing from 44.5 to 49.5 per cent ethoxyl. Ethyl cellulose of 45.0 to 46.5 per cent ethoxyl is preferred, especially in the 10 cps. form, i. e. that having, in 5 per cent by weight solution in 60:40 toluene-ethanol at 25° C., a viscosity of about 10 centipoises.

While virtually any of the commercial phenol-modified coumarone-indene resins (Ind. Eng. Chem. 30, 1228 (1938)) may be used in the invention, it is distinctly advantageous to employ one of the harder resins, i. e. one having a melting point, by the method of the publication cited, of 85° to 95° C. The substance known in the trade as "Nevillac H" is very satisfactory. To obtain a lacquer of the desired properties, the phenol-modified coumarone-indene resin should be present in the proportion of from 0.6 to 1.7 parts by weight per part of ethyl cellulose, preferably 1.1 to 1.5 parts.

In the lacquers, the ethyl cellulose and phenol-modified coumarone-indene resins are the essential, and usually the only, resinous constituents. A plasticizer is not absolutely required, but is desirable to increase the flexibility of the lacquer film. The plasticizer must, of course, be compatible with the resinous components and soluble in the alcohol solvent of the lacquers. Aside from these limitations, it may be any of a wide variety of substances commonly used as plasticizers for synthetic resins. The triaryl phosphates, e. g. tricresyl phosphate, are excellent. A plasticizer proportion of 0.3 to 1.0 part per part of ethyl cellulose is ordinarily used.

To avoid crazing of the polystyrene surfaces to which the lacquers of the invention are to be applied, the solvent portion of the lacquer should be of the alcohol type, containing more than 85 per cent by weight of alcohols or ether-alcohols. For adequate drying rates, this alcohol component must be comparatively volatile, i. e. should exhibit a normal boiling point between 75° and 140° C. The compounds most commonly chosen as solvents include ethanol, n-propanol, i-propanol, n-butanol, and 2-ethoxy ethanol. Although single substances are occasionally satisfactory as solvents, best drying characteristics are obtained with mixtures of two or more alcohols or ether-alcohols which boil more than 20° C. apart. Thus, for a spraying lacquer, an appropriate solvent would contain at least 30 per cent by weight of one or more alcohols boiling below 90° C. and at least 30 per cent of another alcohol boiling above 110° C.

The solvent may consist wholly of alcohols or ether-alcohols, or it may contain up to 15 per cent by weight of other solvents. Lower alkyl acetates, especially butyl acetate, are frequently desirable additives, since they act slightly on polystyrene surfaces to increase the adhesion of the lacquer.

Hydrocarbons may sometimes be tolerated in proportions up to 10 per cent, but to make certain that the lacquer does not craze polystyrene, it is usually best to employ a hydrocarbon-free solvent.

In making up the new lacquer, the components are mixed together in conventional manner. One or more pigments may also be added when a pigmented lacquer is wanted. For a spraying lacquer, a solids content of around 25 per cent by weight in the finished lacquer is about right. Higher concentrations, up to 50 per cent solids, are used in brushing and dipping lacquers.

The following examples will further illustrate the invention.

*Example 1*

In preparing a spraying lacquer, the solids content was as follows:

| | Parts by weight |
|---|---|
| Ethyl cellulose (45.0–46.5% ethoxyl 10 centipoises) | 35 |
| "Nevillac H" | 50 |
| Tricresyl phosphate | 15 |
| "Titanox RANC" (titania-base pigment) | 100 |

This mixture was made up to 25 per cent solids content in the following solvent:

| | Percent by weight |
|---|---|
| Ethanol (Formula 2B) | 10 |
| i-Propanol | 20 |
| n-Butanol | 40 |
| 2-ethoxy ethanol | 20 |
| n-Butyl acetate | 10 |

The resulting lacquer was tinted to a tan shade by the addition of a small proportion of chrome yellow and chrome orange pigments. When applied to molded polystyrene chime cases by spraying followed by air drying, the adhesion and hardness of the coating were good. There was no crazing of the cases.

*Example 2*

A spraying lacquer was made up from:

| | Parts by weight |
|---|---|
| Ethyl cellulose (48.5–49.5% ethoxyl 10 centipoises) | 40 |
| "Nevillac H" | 45 |
| Tricresyl phosphate | 15 |
| "Titanox RANC" | 100 |

This mixture was made up to 25 per cent solids content in the solvent of Example 1 and applied to molded polystyrene by spraying. The lacquer gave a hard, opaque finish in one coat. Adhesion and water resistance were good. No crazing of the polystyrene occurred.

*Example 3*

A black matte-finish lacquer was prepared from:

| | Parts by weight |
|---|---|
| Ethyl cellulose (45.0–46.5% ethoxyl 10 centipoises) | 40 |
| "Nevillac H" | 45 |
| Tricresyl phosphate | 15 |
| "Dicalite" (diatomaceous silica pigment) | 100 |
| Carbon black | 7 |

These solids were made up to 25 per cent concentration in the solvent of Example 1. The lacquer was applied to the interior of molded polystyrene cameras by spraying. Adhesion was good, and no crazing was observed.

*Example 4*

A tan-colored lacquer was made up from:

| | Parts by weight |
|---|---|
| Ethyl cellulose (45.0–46.5 per cent ethoxyl) | 33 |
| "Nevillac H" | 39 |
| Tricresyl phosphate | 28 |
| "Asbestine" (asbestos-type pigment) | 100 |
| "Titanox RANC" | 100 |
| Chrome pigments | 12 | dissolved to 50 per cent solids in the solvent of Example 1. The lacquer was brushed on polystyrene molded electric razor cases, air-dried 30 minutes and oven-dried 20 minutes at 70° C. Adhesion was good, reaching the maximum after 24 hours; no crazing occurred. Application of the lacquer markedly dampened vibration of the cases during actual use in electric razors.

What is claimed is:

1. A lacquer composition, particularly adapted to coating surfaces of polystyrene, comprising one part by weight of ethyl cellulose having an ethoxyl content of 44.5 to 49.5 per cent and 0.6 to 1.7 parts of a phenol-modified coumarone-indene resin as the essential film-forming ingredients dissolved in a solvent therefore of which more than 85 per cent by weight is a material boiling between 75° and 140° C. and composed of at least one substance of the group consisting of alcohols and ether-alcohols, such solvent containing not more than 10 per cent of a hydrocarbon.

2. A composition according to claim 1 wherein the material boiling between 75° and 140° C. contains at least two alcohols which boil more than 20° C. apart.

3. A lacquer composition, particularly adapted to coating surfaces of polystyrene, comprising one part by weight of ethyl cellulose, 45.0 to 46.5 per cent ethoxyl, 1.1 to 1.5 parts of a phenol-modified coumarone-indene resin having a melting point of 85° to 95° C., and 0.3 to 1.0 part of an alcohol-soluble plasticizer compatible with the aforesaid components, dissolved in a hydrocarbon-free solvent therefor of which more than 85 per cent by weight consists of a mixture of substances having individual boiling points between 75° and 140° C. each selected from the group consisting of alcohols and ether-alcohols, such mixture containing at least 30 per cent of an alcohol boiling below 90° C. and at least 30 per cent of an alcohol boiling above 110° C., the solids content of such lacquer being at least 25 per cent.

4. A composition according to claim 3 wherein the solvent also contains a lower alkyl acetate in a proportion less than 15 per cent by weight.

5. A composition according to claim 4 wherein the lower alkyl acetate is butyl acetate.

6. A composition according to claim 3 wherein the plasticizer is a triaryl phosphate.

7. A composition according to claim 3 wherein the plasticizer is tricresyl phosphate.

8. A lacquer composition, particularly adapted to coating surfaces of polystyrene, comprising one part by weight of ethyl cellulose 45.0 to 46.5 per cent ethoxyl, 1.1 part of a phenol-modified coumarone-indene resin having a melting point of 85° to 95° C. and 0.38 part of tricresyl phosphate as the essential film-forming ingredients dissolved in a solvent consisting of ethanol 10 per cent by weight, isopropanol 20 per cent, n-butanol 40 per cent, ethoxyethanol 20 per cent, and butyl acetate 10 per cent, the solids content of such lacquer being at least 25 per cent.

9. As an article of manufacture, a molded polystyrene object having adhering to the surface thereof a film of a coating composition essentially comprising one part by weight ethyl cellulose having an ethoxyl content of 44.5 to 49.5 per cent and 0.6 to 1.7 parts of a phenol-modified coumarone-indene resin as the essential film-forming ingredients.

10. As an article of manufacture, a molded polystyrene object having adhering to the surface thereof a film of a coating composition essentially comprising one part by weight ethyl cellulose, 45.0 to 46.5 per cent ethoxyl, and 1.1 to 1.5 parts of a phenol-modified coumarone-indene resin having a melting point of 85° to 95° C. as the essential film-forming ingredients.

KENNETH D. BACON.
ARTHUR E. YOUNG.

REFERENCES CITED

The following references are of record in the file of this patent:

UNITED STATES PATENTS

| Number | Name | Date |
| --- | --- | --- |
| 2,319,386 | Carmody et al. | May 19, 1943 |